US012704024B2

(12) United States Patent
Pai et al.

(10) Patent No.: US 12,704,024 B2
(45) Date of Patent: Aug. 11, 2026

(54) HIGH TEMPERATURE SUPERCONDUCTING CABLE BASED POWER DELIVERY SYSTEM IN PULSED POWER DRILLING

(71) Applicant: Halliburton Energy Services, Inc., Houston, TX (US)

(72) Inventors: Nagaraja K. Pai, Houston, TX (US); Robert Charles De Long, Tulsa, OK (US); Hassan Mansir, Frimley (GB); Boguslaw Wiecek, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/928,761

(22) Filed: Oct. 28, 2024

(65) Prior Publication Data

US 2026/0002416 A1    Jan. 1, 2026

Related U.S. Application Data

(60) Provisional application No. 63/665,415, filed on Jun. 28, 2024.

(51) Int. Cl.
*E21B 7/15* (2006.01)
*F04B 37/08* (2006.01)
*H01B 12/16* (2006.01)

(52) U.S. Cl.
CPC ................ *E21B 7/15* (2013.01); *F04B 37/08* (2013.01); *H01B 12/16* (2013.01)

(58) Field of Classification Search
CPC ............ E21B 7/15; F04B 37/08; H01B 12/16
See application file for complete search history.

(56) References Cited

U.S. PATENT DOCUMENTS 3,650,337 A * 3/1972 Andrews ................. E21B 21/16 175/71
4,015,437 A * 4/1977 Daus ...................... H01B 12/16 62/76

(Continued)

FOREIGN PATENT DOCUMENTS

AU 2010256522 2/2012
CA 3231158 5/2023

(Continued)

OTHER PUBLICATIONS

"PCT Application No. PCT/US2022/079577, International Preliminary Report on Patentability", May 23, 2024, 7 pages.

(Continued)

*Primary Examiner* — Aaron L Lembo
(74) *Attorney, Agent, or Firm* — DeLizio, Peacock, Lewin and Guerra, LLP

(57) ABSTRACT

An apparatus comprises one or more high temperature superconducting cables configured to supply power from surface to a bottom hole assembly positioned in a wellbore while drilling the wellbore in a subsurface formation. The apparatus comprises one or more cryogenic liquid supply channels positioned within the one or more high temperature superconducting cables, wherein fluid is pumped, via one or more cryogenic pumps, into the one or more cryogenic liquid supply channels to keep a temperature of the one or more high temperature superconducting cables below a critical temperature.

19 Claims, 9 Drawing Sheets

(56) References Cited

U.S. PATENT DOCUMENTS

| | | | | |
|---|---|---|---|---|
| 6,448,501 | B1 * | 9/2002 | Mcintyre | H01B 12/16 174/15.5 |
| 7,301,323 | B2 * | 11/2007 | Ichikawa | H02H 7/001 324/71.6 |
| 7,748,102 | B2 * | 7/2010 | Manousiouthakis | H01B 12/16 29/599 |
| 7,798,220 | B2 * | 9/2010 | Vinegar | C10G 1/008 166/272.3 |
| 8,408,064 | B2 * | 4/2013 | Hartog | E21B 47/107 73/643 |
| 8,437,819 | B2 * | 5/2013 | Takayasu | H01B 12/02 505/231 |
| 9,874,077 | B2 * | 1/2018 | Petty | H02K 5/132 |
| 11,326,399 | B2 | 5/2022 | Gleitman et al. | |
| 11,680,447 | B2 | 6/2023 | Pai et al. | |
| 12,020,831 | B2 * | 6/2024 | Ashworth | H01B 12/14 |
| 12,104,466 | B2 | 10/2024 | Finke et al. | |
| 12,173,605 | B1 * | 12/2024 | Gleitman | E21B 7/15 |
| 2002/0134533 | A1 | 9/2002 | Bechis et al. | |
| 2006/0037779 | A1 | 2/2006 | Moeny et al. | |
| 2006/0038437 | A1 * | 2/2006 | Moeny | H01B 3/20 299/14 |
| 2007/0137893 | A1 | 6/2007 | Moeny et al. | |
| 2007/0194759 | A1 | 8/2007 | Shimizu et al. | |
| 2008/0185184 | A1 | 8/2008 | Maguire | |
| 2008/0245568 | A1 | 10/2008 | Jeffryes | |
| 2011/0275521 | A1 | 11/2011 | Stemmle et al. | |
| 2014/0131044 | A1 * | 5/2014 | Parsche | E21B 36/001 166/57 |
| 2014/0221213 | A1 * | 8/2014 | Fukuda | H01B 12/16 174/15.5 |
| 2016/0326806 | A1 | 11/2016 | Lund et al. | |
| 2018/0148981 | A1 | 5/2018 | Moeny | |
| 2018/0287533 | A1 | 10/2018 | Rajagopalan | |
| 2019/0316419 | A1 | 10/2019 | Bayol et al. | |
| 2020/0370375 | A1 | 11/2020 | Gleitman et al. | |
| 2021/0324683 | A1 | 10/2021 | Gleitman et al. | |
| 2022/0195806 | A1 | 6/2022 | Pai et al. | |
| 2022/0195866 | A1 | 6/2022 | Sedano | |
| 2022/0359104 | A1 | 11/2022 | Willén et al. | |
| 2023/0063340 | A1 * | 3/2023 | Crawford | E21B 49/00 |
| 2023/0132937 | A1 | 5/2023 | Finke et al. | |
| 2023/0143504 | A1 | 5/2023 | Finke et al. | |
| 2023/0144083 | A1 | 5/2023 | Finke et al. | |
| 2023/0144439 | A1 | 5/2023 | Finke et al. | |
| 2023/0145343 | A1 | 5/2023 | Finke et al. | |
| 2025/0034946 | A1 | 1/2025 | Pai | |
| 2025/0191816 | A1 | 6/2025 | Mansir et al. | |

FOREIGN PATENT DOCUMENTS

| | | | |
|---|---|---|---|
| CA | 3232370 | 5/2023 | |
| CN | 111119739 | 5/2020 | |
| CN | 114464363 A * | 5/2022 | H01B 7/17 |
| EP | 0497420 | 8/1992 | |
| EP | 3115997 | 1/2017 | |
| EP | 3508683 | 11/2020 | |
| EP | 3739163 | 11/2020 | |
| EP | 4381171 | 6/2024 | |
| EP | 4388168 | 6/2024 | |
| EP | 4392645 | 7/2024 | |
| KR | 20190010028 | 1/2019 | |
| WO | 2005124213 | 12/2005 | |
| WO | 2014145259 | 9/2014 | |
| WO | 2019245544 | 12/2019 | |
| WO | 2020236189 | 11/2020 | |
| WO | 2022140719 | 6/2022 | |
| WO | 2023086841 | 5/2023 | |
| WO | 2023086844 | 5/2023 | |
| WO | 2023086845 | 5/2023 | |
| WO | 2023086846 | 5/2023 | |
| WO | 2025023978 | 1/2025 | |

OTHER PUBLICATIONS

"PCT Application No. PCT/US2022/079577, International Search Report and Written Opinion", Mar. 9, 2023, 11 pages.
"PCT Application No. PCT/US2022/079580, International Preliminary Report on Patentability", May 23, 2024, 8 pages.
"PCT Application No. PCT/US2022/079580, International Search Report and Written Opinion", Mar. 15, 2023, 14 pages.
"PCT Application No. PCT/US2022/079581, International Preliminary Report on Patentability", May 23, 2024, 6 pages.
"PCT Application No. PCT/US2022/079581, International Search Report and Written Opinion", Mar. 15, 2023, 12 pages.
"PCT Application No. PCT/US2022/079583, International Preliminary Report on Patentability", May 23, 2024, 7 pages.
"PCT Application No. PCT/US2022/079583, International Search Report and Written Opinion", Mar. 10, 2023, 12 pages.
"PCT Application No. PCT/US2023/071164, International Search Report and Written Opinion", Apr. 18, 2024, 13 pages.
"PCT Application No. PCT/US2023/083464 International Search Report and Written Opinion", Aug. 30, 2024, 10 pages.
"U.S. Appl. No. 17/982,589, Non-Final Office Action", Dec. 29, 2023, 12 pages.
"U.S. Appl. No. 17/982,739, Final Office Action", Jun. 12, 2024, 10 pages.
"U.S. Appl. No. 17/982,739, Non-Final Office Action", Dec. 14, 2023, 10 pages.
"U.S. Appl. No. 17/982,789, Non-Final Office Action", Dec. 22, 2023, 7 pages.
"U.S. Appl. No. 18/359,761 Final Office Action", Aug. 2, 2024, 10 pages.
"U.S. Appl. No. 18/359,761 Non Final Office Action", Jun. 5, 2024, 9 pages.
Paramane, et al., "A Review on Insulation and Dielectrics for High-Temperature Superconducting Cables for Power Distribution: Progress, Challenges, and Prospects", IEEE Transactions on Applied Superconductivity, vol. 33, No. 6, Sep. 2023, Sep. 2023, 31 pages.
"U.S. Appl. No. 18/359,761 Non-Final Office Action", Nov. 6, 2024, 10 pages.
"PCT Application No. PCT/US2024/054615 International Search Report and Written Opinion", Mar. 20, 2025, 10 pages.
"U.S. Appl. No. 18/359,761 Final Office Action", Mar. 5, 2025, 12 pages.
"U.S. Appl. No. 18/535,374 Non-Final Office Action", Feb. 14, 2025, 12 pages.
"U.S. Appl. No. 18/535,374 Final Office Action", Jul. 17, 2025, 11 pages.

* cited by examiner

HIGH TEMPERATURE SUPERCONDUCTING CABLE BASED POWER DELIVERY SYSTEM IN PULSED POWER DRILLING

FIELD

Some implementations relate generally to the field of drilling a wellbore in a subsurface formation and more particularly to the field of high temperature superconducting cables utilized in drilling operations.

BACKGROUND

Conventional drilling operations may use a traditional drill bit to mechanically drill the wellbore into a subsurface formation. In contrast, electrocrushing drilling uses pulsed power technology to drill the wellbore. Pulsed power technology repeatedly applies a high electric potential across the electrodes of an electrocrushing drill bit, which ultimately causes the surrounding rock to fracture. The fractured rock is carried away from the bit by drilling fluid and the bit advances downhole. The amount of power required to be supplied downhole to the bottom hole assembly (BHA) for pulsed power drilling is significant. The power may be supplied from a power source on the surface to the BHA downhole via one or more power cables.

BRIEF DESCRIPTION OF THE DRAWINGS

Implementation of the disclosure may be better understood by referencing the accompanying drawings.

DESCRIPTION

Figure 1:
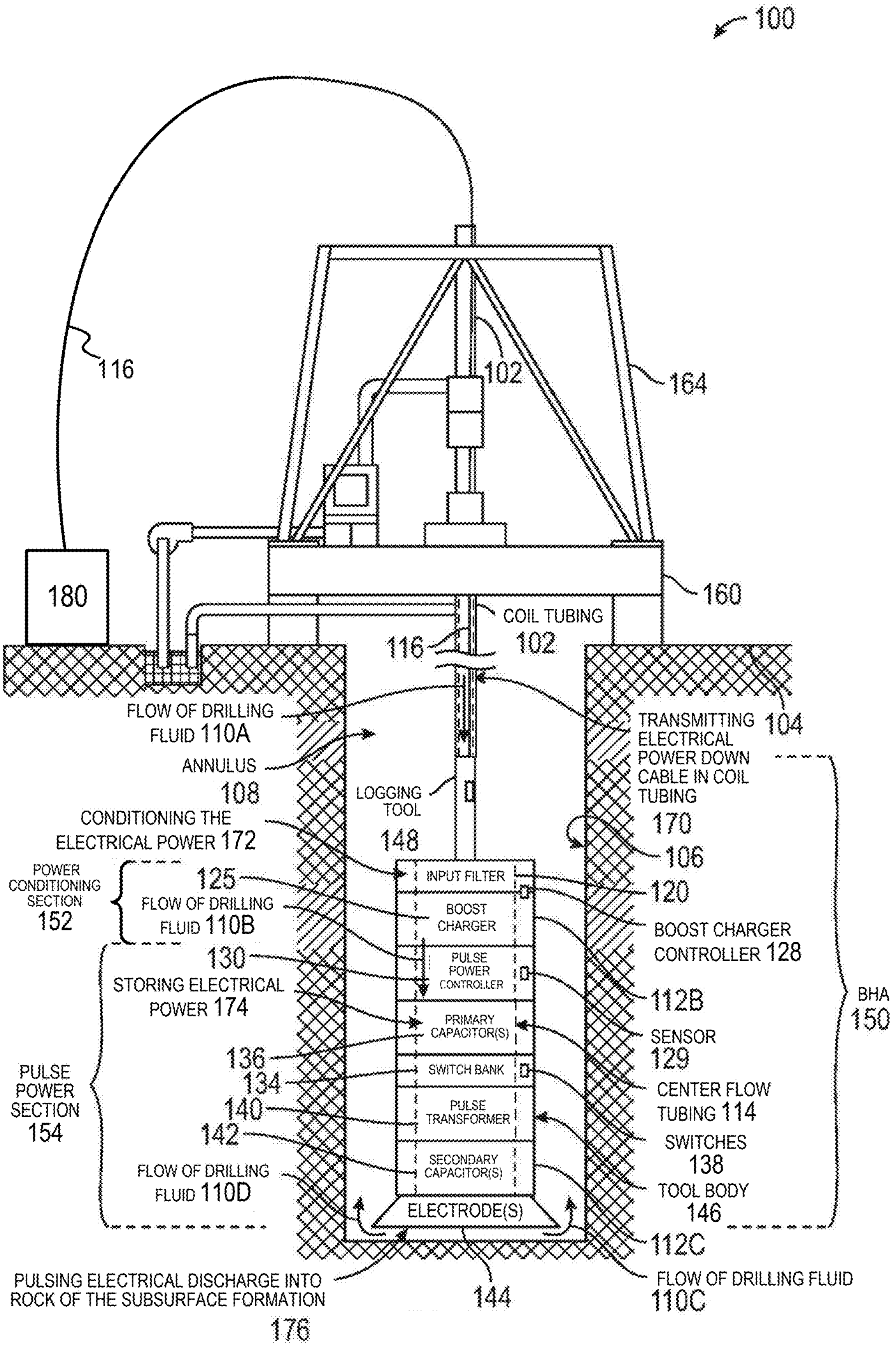
FIG. 1 is a schematic diagram depicting an example coiled tubing pulsed power drilling assembly, according to some implementations.

The description that follows includes example systems, methods, techniques, and program flows that embody aspects of the disclosure. However, it is understood that this disclosure may be practiced without these specific details. For instance, this disclosure refers to certain configurations of high temperature superconducting cables to provide power to a bottom hole assembly in a wellbore being drilled in a subsurface formation. Aspects of this disclosure can also be applied to other configurations that may supply power to the bottom hole assembly. For clarity, some well-known instruction instances, protocols, structures, and techniques have been omitted.

Example implementations relate to supplying power to one or more components of a bottom hole assembly (BHA) with one or more high temperature superconducting (HTS) cables during drilling operations. Electrical power delivery for downhole tools may be limited to factors such as wire size, wire type, impedance of the cable used, etc. In some implementations, HTS cables offer high-power density power transmission solution as they have the ability to carry larger amounts of electrical current within a smaller physical size compared to conventional cables (such as copper cables). This characteristic may be particularly advantageous pulsed power drilling operations, where compact solutions are required, and power losses may limit the amount of power delivered to the BHA.

In some implementations, electrically powered drilling (such as pulsed power drilling) may require significant amounts of power to form a wellbore in a subsurface formation. For example, pulsed power drilling may typically use 10-600 kilowatts (kW) of power. A BHA positioned at/near the distal end of one or more coiled tubing strings may be configured with one or more components to crush the rock of the subsurface formation to form the wellbore when supplied with electric power. Conventional operations may provide power to the BHA via a multiconductor power cable. However, due to the power requirements of the pulsed power drilling operations, the power supplied to the BHA may be limited due to cable impedance, cable losses, etc., resulting in a decrease in drilling efficiency. In some implementations, one or more high temperature superconductor (HTS) cables may be utilized to supply power from a power source on the surface to the BHA during the drilling operations instead of the traditional multiconductor cables.

In some implementations, HTS cables may have a low resistance relative to traditional conductor cables, resulting in an increase in carrying capacity. For example, the carrying capacity of an HTS cable may be 10 times that of a traditional conductor cable of a similar physical size. Additionally, or alternatively, the HTS cables may reduce the cable conduction losses by approximately 2 orders of magnitude. HTS cables may operate in superconducting mode when the temperature of the superconducting material (i.e., HTS tape) is kept below the critical temperature of the superconducting material. For example, the superconducting material may include materials such as bismuth strontium calcium copper oxide (BSCCO) with a critical temperature of approximately 113 degrees Kelvin (K), yttrium barium copper oxide (YBCO) with a critical temperature of approximately 93 degrees K, etc. To operate in superconducting mode, the superconducting material may need to be continuously cooled. Accordingly, cryogenic liquid, such as liquid nitrogen, liquid helium, or any other suitable cryogenic fluid, may be pumped, via one or more cryogenic pumps, through one or more cryogenic liquid supply channels within the HTS cables to continuously reduce the temperature of the HTS cables such that the temperature is kept below the critical temperature. In some implementations, the quantity and/or flow rate of the cryogenic fluid may be determined by the configuration of the HTS cable, the transmission losses, etc.

In some implementations, one or more HTS cables may positioned in the wellbore such that the HTS cables may be electrically coupled with the BHA while also protected from the downhole environment (high pressure, high temperature, flow of drilling fluid with or without cuttings, etc.). In pulsed power drilling operations, the HTS cables may be positioned inside one or more coiled tubing. For example, a primary coiled tubing string may be coupled with the BHA downhole. The HTS cables may be positioned in another coiled tubing string. The coiled tubing string with the HTS cables may be positioned inside the primary coiled tubing string or on the outside of the primary coiled tubing string. In some implementations, the HTS cables may be positioned inside and/or outside the primary coiled tubing without its own coiled tubing. In some implementations, the HTS cables may be positioned on the outside of drill pipe in with or without its own coiled tubing.

The electrical power delivered to the BHA may be direct current (DC) power, alternating current (AC) power, pulsed power, etc. The HTS cables may include mono-conductor HTS cables, dual conductor HTS cables, triple conductor HTS cables, or any other multiconductor HTS cable configuration. The HTS cables may be any suitable cable structure such as a round conductor cable, twisted conductor cable, layered conductor cable, coaxial cable, etc. The HTS cables may be configured with any other suitable components such as a fluid return channel, copper cores, dielectrics, protective coverings, etc. In some implementations, the HTS cables may be bundled with other lines/cables such as other HTS cable(s), auxiliary power conductors, telemetry conductors, fluid lines, or any combination thereof.

The cryogenic liquid supply channels within the HTS cables may be central to the HTS cables (such as in a coaxial configuration) and/or in the annular areas of the HTS cables (such as in a multiconductor configuration). In some implementations, one or more of the cryogenic liquid channels may supply fluid from the surface (e.g., from one or more cryogenic pumps) to the BHA. In some implementations, one or more of the cryogenic liquid supply channels may supply fluid to only a portion of the HTS cables. For example, fluid in a cryogenic liquid supply channel that extends from the surface to the BHA may increase to a temperature as depth increases such that by the time the fluid reaches the BHA, the fluid is too hot to reduce the temperature of the HTS cables proximate the BHA, resulting in the superconducting material potentially being unable to operation in superconducting mode. Alternatively, the cryogenic liquid supply channels may supply fluid to segments along the HTS cables such that the fluid may not heat up before reaching the target length of the HTS cables. For instance, a cryogenic liquid supply channel may supply liquid nitrogen to a segment in the HTS cable corresponding to a depth interval of 7,000 feet measure depth (MD) to 8,000 feet MD in the wellbore, and another cryogenic liquid supply channel may supply liquid nitrogen to a segment corresponding to a depth interval of 8,000 feet MD to 9,000 feet MD. In some implementations, the cryogenic liquid supply channels may be an open or closed loop. For example, an open loop may discharge the fluid into the drilling mud once it is pumped through at the end of the cryogenic liquid supply channel, where it may dissolve into the drilling mud to be transported to the surface. Alternatively, the HTS cables may be configured with one or more cryogenic liquid return channels that may return the fluid to the surface to be re-cooled and recycled. The fluid may be pumped into the cryogenic liquid supply channels under pressure, via one or more cryogenic pumps, to maintain sufficient flow to keep the conductor temperatures below critical temperature.

In some implementations, the HTS cables may be utilized in other applications other than pulse power drilling. For example, the cable structure may be applicable to other activities and/or downhole tools such as electric drive downhole motors for drilling operations, electric or electronic drill head bottom hole assemblies, electronic measuring tools, completion operations, etc. The HTS cables may be utilized in operations outside of oil and gas operations. For example, the cable structure may be utilized in ESP geothermal recovery operations, water source wells, dewatering applications.

Example Systems

FIG. 1 is a schematic diagram depicting an example coiled tubing pulsed power drilling assembly, according to some implementations. An example pulsed power drilling system 100 may perform or be used to perform a number of example pulsed power drilling (PPD) operations 170-176. The pulsed power drilling operations 170-176 are described in more detail below (after the description of the different parts of the example pulsed power drilling system 100).

The example pulsed power drilling system 100 may include a pulsed power drilling bottomhole assembly (hereinafter "BHA") 150 positioned in a wellbore 106 and coupled to a coiled tubing 102. The coiled tubing 102 may comprise one or more coiled tubing strings sourced from one or more coiled tubing reels (not shown). The one or more coiled tubing strings (i.e., coiled tubing from one or more reels) may be coupled together to reach a target depth in the wellbore 106. While depicted on the surface 104 as an onshore drilling operation, example implementations may also be performed as an offshore drilling operation.

In some implementations, the delivered power supplied may be used to perform pulse power drilling. In particular, conventional wellbore drilling includes rotary drilling using a drill bit having cutting elements that is rotated to cause a cutting (fracturing or crushing) of rock. In contrast, pulse power drilling extends the wellbore using discharges of electric pulses that may include short duration, periodic, high-voltage pulses that are discharged through the rock in a surrounding formation. Such discharges may create an internal pressure which applies a tensional stress substantial to break or fracture the rock in tension. Pulse power drilling may create a plasma in a drilling fluid or rock downhole which functions as a high-energy discharge. The creation of the plasma downhole may involve injecting large amounts of energy into the subsurface formation. Thus, pulse power drilling may require substantial amounts of both voltage and current for successful breakage or fracturing of rock in a downhole environment.

The BHA 150 may be configured to further the advancement of the wellbore 106 using by pulsing electrical power generated by a power supply 180 at the surface 104 and transmitted to electrodes 144 via a cable 116. The electrodes 144 may be configured to emit an electrical discharge through formation material of a subsurface formation along the bottom face of the wellbore 106 and in the nearby proximity to the electrodes 144. The cable 116 may be capable of supplying power from the power supply 180 at an order of magnitude which provides for the creation of the plasma upon pulse discharges into the formation. The cable 116 may also be capable of transmitting enough power such that an electrical discharge emitted into the formation creates a sufficient amount of high internal pressure to destroy the rock in tension, as described above.

In some implementations, the cable 116 may comprise one or more high temperature superconducting cables. To convey electrical power, the cable 116 may be configured to supply high-voltage DC power, AC power, pulse power, etc. to the electrodes 144. In some implementations, a fiber optic cable or a coaxial communication cable may be part of the cable 116 to transmit data between the surface 104 and the BHA 150. Alternatively, or in addition, a fiber optic cable or a coaxial communication cable may be a separate cable that is conveyed downhole within the coiled tubing 102. Using a cable rather than using other communication mediums (e.g., mud pulse telemetry) may enable high speed communication with equipment at the surface 104. The cable(s) 116 may utilize a single solid cable, a solid multi-cable configuration, or stranded cables that are configured to have a low inductance.

While conveying such a cable to depth with a traditional segmented drill pipe may prove exceedingly difficult, the coiled tubing 102 may allow for both the cable 116 to be housed within and may also allow drilling fluid or mud to flow from the surface to downhole to provide cooling to the electrodes 144, removing of cuttings, etc. For example, each coiled tubing reel may comprise up to 5,000 ft of coiled tubing, although various sizes of reels may be used, whereas a stand (typically comprising three or four individual joints) of segmented drill pipe may be between 30-55 ft in length. Thus, the segmented drill pipe may require additional drill pipe to be added every 30-55 ft of drilling, and running a power cable within the drill pipe in this configuration may prove to be difficult. In some implementations, the coiled tubing reel(s) configured to store the coiled tubing 102 at the surface 104 may have an increased inductance when compared to the cable 116 and BHA 150 in the wellbore 106. This increased inductance may occur because the cable 116 is wound within or otherwise with the coiled tubing 102 in the reel. The inductance of the coiled tubing reel may increase with the number of turns the coil tubing 102 and cable 116 make around the reel. As more coiled tubing 102 is conveyed into the wellbore 106, the inductance may decrease over time. The difference in inductance at the reel and the cable 116 in the wellbore 106 may induce a voltage overshot and/or ringing from the power supply 180 when transmitting pulsed power to the capacitors 136, 142. The input filter 120, coupled in series with the cable 116 and power supply 180, may be configured to reduce the ringing caused by the inductance discrepancies.

In some implementations, continuous tubing such as the coiled tubing 102 may allow for longer wells to be drilled using a pulse-power drill string. For example, one or more coiled tubings (also referred to as coiled tubing strings) 102 housing the cable 116 may allow the BHA 150 to receive consistent, direct DC power from the power supply 180 via the cable 116 coupled to the coiled tubing 102. This sustained level of power may enable the BHA 150 to extend the wellbore 106 up to 2-3 miles vertically. The BHA 150 and electrodes 144, with the benefit of consistent, high voltage DC power, may be capable of extending the wellbore 106 up to 7 miles laterally, which may not be feasible with intermittent power sources used in other pulsed power drilling operations. As further described below, the constant supply of high voltage DC power, AC power, and/or pulse power may be used to power one or more downhole operations in addition to drilling the wellbore 106. For example, DC power output from the power supply 180 may be used to power one or more of the following: nuclear magnetic resonance (NMR) operations, mud pulsing, geosteering equipment, measurement-while drilling (MWD) equipment, etc.

The cable 116 may be configured to reduce conduction losses and total voltage drop as power travels from the power supply 180 to the BHA 150. Compared to more traditional configurations using a downhole power generation device and hydraulic power generation (downhole generator/turbine, alternator, etc.), the cable 116 may be configured to efficiently deliver up to 1,000 kilowatts (kW) of impedance-matched power to the BHA 150 with minimal losses. In some implementations, the cable 116 may deliver 200 kilovolts (kV) to the electrodes 144. The cable 116 may be mounted or otherwise secured within the coiled tubing 102. In some implementations, the cable 116 may be pre-assembled within the coiled tubing 102. In other implementations, the cable may be mounted or strapped to the outside of the coiled tubing 102. While delivering high power to the electrodes 144, the cable(s) 116 may be properly supported within or against the coiled tubing 102 to withstand a fast-flowing drilling fluid, both for inflow of drilling fluid down the coiled tubing 102 and an outflow of drilling fluid up the annulus 108. For example, drilling fluid sent down the coiled tubing 102 may be highly viscous and under high pressure. Accordingly, the coiled tubing 102 and cable 116 may form a mud-flow pipe that may also deliver electrical power to the BHA 150.

Using HTS cables for the cable 116 to transmit the electrical power to the BHA 150 may also improve the thermal efficiency of the system. For example, cryogenic liquid supply channels may supply fluid to the HTC cables to keep the temperature of the HTS cables less than the critical temperature, and thus reducing the heat emitted by the cable 116. Lower heat losses may enable the pulsed power section 154 to operate more efficiently, which may enable the electrodes 144 to arc into the formation (thus, drilling the formation) at an increased rate. In addition to minimizing heat losses, the pulsed power drilling system 100 may also be configured to minimize power losses. Utilizing the cable 116 eliminates the need for a complex power conversion apparatus. The power topology comprising the power supply 180, the cable 116, and the boost charger 125 may reduce power losses during the delivery of a required charge to the electrodes 144 when compared to more traditional PPD systems.

As illustrated in FIG. 1, the BHA 150 includes multiple sub-assemblies, including, in some implementations, an input filter 120 at a top of the BHA 150. The top of the assembly is a face of the BHA 150 furthest from a drilling face of the BHA 150 (which contains the electrodes 144). The input filter 120 is coupled to multiple additional subsections or components. The input filter 120 may be configured to reduce ripples in current and/or voltage output from the power supply 180 and along the cable 116. A boost charger 125 (comprising a voltage booster or similar power converter and a multi-mode capacitor charger) positioned below the input filter 120 may be configured to receive the filtered electrical power output from the input filter 120. In some implementations, the multi-mode capacitor charger may be a smart charger capable of fast charging. For example, the multi-mode capacitor charger may be configured to switch between a constant current mode and constant power mode to optimize charging of the primary capacitor (s) 136 depending upon which modes charge the capacitors 136, 142 fastest. The BHA 150 may additionally comprise a pulsed power controller 130, a switch bank 134 (including one or more switches 138), one or more primary capacitor(s) 136, a pulsed transformer 140 with one or more primary and secondary windings, one or more secondary capacitors 142, and the electrodes 144. In some implementations, the power supply 180 (at the surface 104), the cable 116, input filter 120, and boost charger 125 (located in the wellbore 106) may be referred to as a power delivery system.

DC power output from the power supply 180 may be stored in the capacitors 126, 142 prior to a discharge criteria being satisfied. For example, a discharge or load criteria may be that a defined amount of energy has been stored. As an example, this criteria may be satisfied when the primary capacitor(s) 136 is fully charged. In another example, this criteria may be satisfied when the amount of energy that has been stored is sufficient to break the rock in the current subsurface formation. Accordingly, the amount of energy needed may vary depending on the type of rock. In another example, the criteria may be that a bottom of the pulse power drill string is in contact with a bottom of the wellbore 106. This may include any contact or some defined amount of surface area of the bottom of the pulse power drill string being in contact. In another example, the discharge criteria may be a defined amount of time since a prior electrical discharge.

In some implementations, the power may continue to be supplied by the cable 116 after the primary capacitor(s) 136 is fully charged. After the amount of energy stored in the primary capacitor(s) 136 exceeds a defined amount (e.g., fully charged), a switch within switch bank 134 may be opened to prevent additional storage of energy in the primary capacitor(s) 136 until the energy is discharged therefrom to generate a pulse of electrical discharge emitted into the subsurface formation. The switch may then be closed to again allow for storage of energy in the primary capacitor(s) 136.

The BHA 150 may be divided into a power conditioning section (PCS) 152 and a pulsed power section 154. The power conditioning section 152 may include the input filter 120 and the boost charger 125. The power supply 180 may be configured to deliver medium voltage or high voltage DC power to the boost charger 125 and power conditioning section 152 which in turn sends power to charge one or more capacitors (136, 142) of the pulsed power section 154. The pulsed power section 154 may include the pulsed power controller 130, the switch bank 134 (and switch(es) 138), the one or more primary capacitor(s) 136, the pulsed transformer 140, the one or more secondary capacitors 142, and the electrodes 144. Components may be divided between the power conditioning section 152 and the pulsed power section 154 in other arrangements, and the order of the components may be other than shown.

While a single boost charger 125 is depicted in FIG. 1, two or more boost chargers may be used along different locations along the coiled tubing 102 to boost the voltage of received power and to charge the capacitors 136, 142. For example, a boost charger 125 may be installed at one or more locations in the coiled tubing 102. In some implementations, as multiple reels of coiled tubing are conveyed into the wellbore 106, couplings between each coiled tubing string may comprise a boost charger 125. Each of the boost chargers along the coiled tubing 102 (or string of coiled tubings) may be configured to increase the voltage stepwise until reaching the capacitors 136, 142 where a final boost charger proximate to the BHA 150 may be used to charge the capacitors 136, 142.

In some implementations, DC electrical power may be conditioned by one or more input filters before storage in primary capacitor(s) 136 in the BHA 150 (as stored energy). For example, the power conditioning section 152 (or PCS) may be configured to condition electrical power prior to use within and eventual discharge from the pulsed power section 154. The input filter 120 may be configured to receive electric power from the cable 116 and output conditioned electrical power. The conditioning may comprise filtering, by the input filter 120, out ripples in current and voltage from the DC power received from the power supply 180. While the DC power is continuous, the loading of the boost charger 125 may be slightly pulsed rather than exhibiting continuous power draw. The input filter 120 may flatten any ripple in the received DC power prior to being used in the pulsed power section 154. Further processing of the electrical power output received at the PCS 152 may include voltage boosting, and frequency and/or waveform smoothing or regulating of the received electrical power.

In some implementations, the secondary capacitor(s) 142 may be configured with a higher or current rating than the primary capacitor(s) 136. In this configuration, the power supply 180 may be configured with a higher voltage rating (>6 kV) and may be coupled to the input filter 120 and boost charger 125. From the boost charger 125, the higher voltage power may be routed to the secondary capacitor(s) 142 and output from the electrode(s) 144. While FIG. 1 depicts the PCS 152 positioned in the wellbore 106 as part of the BHA 150, some implementations may position the input filter 120 and boost charger 125 at the surface 104.

A center flow tubing 114 may be coupled to an end of the coiled tubing 102 and may travel through the BHA 150, acting as a conveyance tubing. In some implementations, the center flow tubing 114 may be a shorter section of coiled tubing configured to extend through the PCS 152 and pulsed power section 154. A flow of drilling fluid 110A (illustrated by the arrow pointing downward within the coiled tubing 102) may be provided from the drilling platform 160, and flow to and through the power conditioning section 152 and pulsed power section 154 of the BHA 150, as indicated by the arrow 110B. The PCS 152 may further process and controllably provide the electrical power to the rest of the downstream BHA 150. The stored power may then be output from the electrodes 144 to perform the advancement of the wellbore 106 via periodic electrical discharges. In some implementations, pulsed power drilling (achieved by the periodic electrical discharges) may be capable of advancing the wellbore by 60 to 150 feet per hour through one or more hard rock (i.e., consolidated) subsurface formations. By using the coiled tubing 102, the pulsed power drilling may avoid issues with forming connections between joints of segmented drill pipe. The use of the coiled tubing 102 and electrodes 144 for pulsed power drilling may also eliminate the need for multiple trips to change the drill bit.

In some implementations, the drilling fluid used in the wellbore 106 may comprise a dielectric drilling fluid. The dielectric drilling fluid may be a mixture of drilling mud and one or more dielectric sands which may grant the drilling fluid dielectric properties. While the dielectric sands may increase the viscosity of the drilling fluid, their dielectric properties may ensure that electrical discharges emitted from the electrodes 144 do not propagate up the wellbore 106 or to the surface 104.

The drilling fluid may flow through the BHA 150, as indicated by arrow 110B, and flow out and away from the electrodes 144 and back toward the surface to aid in the removal of the debris generated by the breaking up of the formation material at and nearby the electrodes 144. The fluid flow direction away from the electrodes 144 is indicated by arrows 110C and 110D. In addition, the flow of drilling fluid may provide cooling to one or more devices and to one or more portions of the BHA 150. In various implementations, it is not necessary for the BHA 150 to be rotated as part of the drilling process, but some degree of rotation or oscillations of the BHA 150 may be provided in various implementations of drilling processes utilizing the BHA 150.

The flow of drilling fluid passing through the BHA 150 may continue to flow through the center flow tubing 114, which thereby provides a flow path for the drilling fluid through one or more sub-sections or components of the PCS 152 and PPS 154, as indicated by the arrow 110B pointing downward through the cavity of the sections of the center flow tubing 114. Once arriving at the electrodes 144, the flow of drilling fluid may be expelled out from one or more ports or nozzles located in or in proximity to the electrodes 144. After being expelled from the BHA 150, the drilling fluid may flow back upward toward the surface through an annulus 108 created between the BHA 150 and walls of the wellbore 106.

The center flow tubing 114 may be located along a central longitudinal axis of the BHA 150 and may have an overall outside diameter or outer shaped surface that is smaller in cross-section than the inside surface of a tool body 146 in cross-section. As such, one or more spaces may be created between the center flow tubing 114 and an inside wall of the tool body 146. These one or more spaces may be used to house various components, such as components which make up the input filter 120, the boost charger 125, the boost charger controller 128, the sensor 129, the pulsed power controller 130, the switch bank 134, the one or more switches 138, the one or more primary capacitor(s) 136, the pulsed transformer 140, and the one or more secondary capacitors 142, as shown in FIG. 1. The sensor 129 may be located in different locations within the BHA 150. As depicted in FIG. 1, the sensor 129 is positioned near the pulsed power controller 130. However, the sensor 129 may be in any location within the BHA 150 and may include more than a single sensor (depending on the size and particular sensor measurement). Other components may be included in the spaces created between the center flow tubing 114 and the inside wall of the tool body 146.

The example pulsed power drilling system 100 may include one or more logging tools 148. The logging tool(s) 148 are shown as being coupled to the coiled tubing 102 within the BHA 150. In some implementations, the logging tool 148 may be located above the BHA 150 or may be joined via a shop joint or field joint to BHA 150. The logging tool(s) 148 may include one or more logging with drilling (LWD) or measurement while drilling (MWD) tools, including a resistivity tool, gamma-ray tool, nuclear magnetic resonance (NMR) tool, etc. The logging tools 148 may include one or more sensors to collect data downhole. For example, the logging tools 148 may include pressure sensors, flowmeters, etc. The example pulsed power drilling system 100 may also include directional control, such as for geosteering or directional drilling, which may be part of the BHA 150, the logging tool(s) 148, or located elsewhere on the coiled tubing 102.

Communication from the pulsed power controller 130 to the boost charger controller 128 allows the pulsed power controller 130 to transmit data about and modifications for pulsed power drilling to the power conditioning section 152. Similarly, communications from the boost charger controller 128 to the pulsed power controller 130 may allow the power conditioning section 152 to transmit data about and modifications for pulsed power drilling to the pulsed power section 154. The pulsed power controller 130 may control the discharge of the pulsed power stored for emissions out from the electrodes 144 and into the formation, into drilling mud, or into a combination of formation and drilling fluids. The pulsed power controller 130 may measure data about the electrical characteristics of each of the electrical discharges-such as power, current, and voltage emitted by the electrodes 144. Based on information measured for each discharge, the pulsed power controller 130 may determine information about drilling and about the electrodes 144, including whether or not the electrodes 144 are firing into the formation (i.e., drilling) or firing into the formation fluid (i.e., electrodes 144 are off bottom). The power conditioning section 152 may control the charge rate and charge voltage for each of the multiple pulsed power electrical discharges. The PCS 152, with electrical power supplied via the cable 116 may create an electrical charge in the range of 10-20 kilovolts (kV) which the pulsed power controller 130 delivers to the formation via the electrodes 144.

When the pulsed power controller 130 may communicate with the power conditioning section 152, the power conditioning section 152 may ramp up and ramp down in response to changes or electrical discharge characteristics detected at the pulsed power controller 130. Because the load on the power conditioning section 152 is large (due to the high voltage), ramping up and ramping down in response to the needs of the pulsed power controller 130 may protect the power conditioning section 152 and associated components from load stress and may extend the lifetime of components of the pulsed power drilling assembly. If the pulsed power controller 130 is unable to communicate with the power conditioning section 152, then the power conditioning section 152 may apply a constant charge rate and charge voltage to the electrodes 144.

In instances where the BHA 150 is off bottom, electrical power input to the system may be absorbed (at least partially) by drilling fluid, which may be vaporized, boiled off, or destroyed because of the large power load transmitted in the electrical pulses. In instances where the BHA 150 is not operating correctly, such as when one or more switch experiences a fault or requires a reset, application of high power to the primary and/or secondary capacitors 136/142 or the electrodes 144 may damage circuitry and switches when applied at unexpected or incorrect times. In these and additional cases, communications, or messages between the pulsed power controller 130 and the power conditioning section 152 may allow the entire BHA 150 to vary charge rates and voltages, along with other adjustments further discussed below. In cases where the pulsed power controller 130 and power conditioning section 152 are autonomous, i.e., not readily in communication with the surface, downhole control of the BHA 150 may improve pulsed power drilling function.

Pulse power drilling operations may include various operations. For example, such an operation may include pulsing of an electrical discharge to breaking of rock to continue to drill the wellbore 106 (e.g., electrocrushing). Another example operation may include pulsing of an electrical discharge while the drill string is off bottom for testing, formation evaluation, etc. Another example operation may include pulsing of an electrical discharge for communication. A series of example pulsed power drilling operations 170-176 are now described. A first operation 170 includes transmitting electrical power generated from the power supply 180 down the cable 116 within the coiled tubing 102. The cable 116 may be mounted within the coiled tubing 102 to withstand a flow of drilling fluid 110A during a pulsed power drilling operation. A second operation 172 includes conditioning the electrical power. For example, the input filter 120 may smooth the electrical power input from the cable 116, and the boost charger 125 may increase a voltage of the electrical power. Conditioning of the electrical power that may be may also include altering or controlling one or more electrical parameters associated with the received electrical power including, but not limited to voltage, current, phase, and frequency.

Example High Temperature Superconducting Cables

Examples of a high temperature superconducting (HTS) cables are now described. The superconducting cables of superconducting cable structure is described in reference to the cable 116 of FIG. 1. The superconducting cables structures are described herein with one or more HTS cables configured in various structures (i.e., 2 HTS cables configured in a flat structure, coaxial, etc.) with respective superconducting material. The structures are not limited to flat and coaxial, but may also be configured in any other suitable structure such as round, twisted, layered, triangular, etc. For example, the HTS cables may be configured in a flat structure to reduce cable inductance. Additionally, or alternatively, each of the HTS cables described herein may include one or more superconducting cables. The insulators described herein may be any suitable material to provide thermal and/or electrical insulation for the components within the superconducting cable structures.

Figure 2:
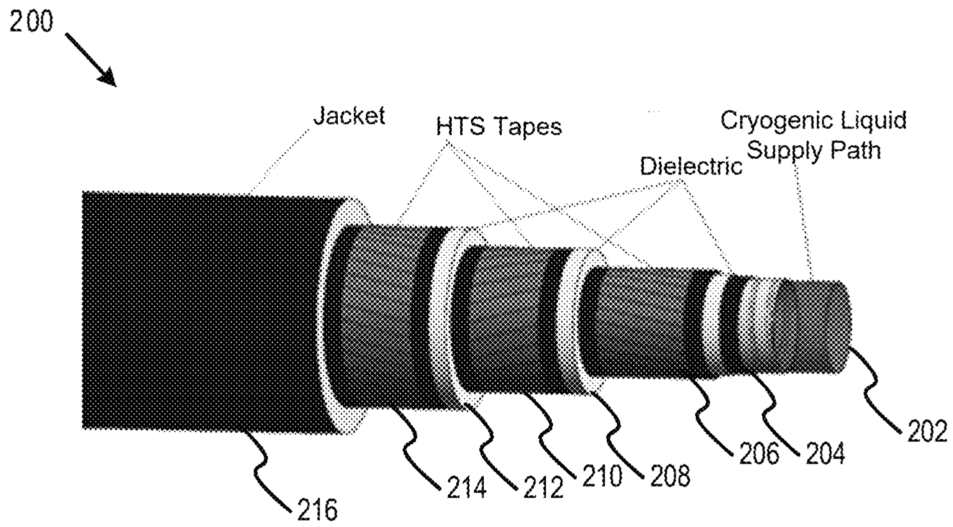
FIG. 2 is a schematic of an example high temperature superconducting cable, according to some implementations.

FIG. 2 is a schematic of an example high temperature superconducting cable, according to some implementations. In particular, FIG. 2 includes a partial cross-sectional view of an HTS cable 200. The HTS cable 200 may be coupled to components of a downhole tool positioned in a wellbore (such as BHA 150 to supply power to the BHA 150 during pulsed power operations of the example pulsed power drilling system 100 of FIG. 1). The HTS cable 200 of FIG. 2 is depicted with three layers of HTS tape 206, 210, and 214 to transmit AC power to the BHA. In some implementations, the HTS cable 200 may include one, two, or more than three layers of HTS tape. For example, the HTS cable 200 may include two layer of HTS tape to supply DC power to the BHA. In some implementations, one or more of the HTS tape 206, 210, and 214 may instead be a quench conductor, such as a copper conductor, to provide auxiliary power to one or more components of the BHA or other components positioned in the wellbore. In some implementations, the quench conductors may provide redundancy, as the HTS tape 206, 210, and 214 (described below) may function as the main power supplier to the BHA and the quench conductor may function as a secondary conductor if the cooling system within the HTS cable 200 may fail. In some implementations, the HTS cable 200 may include other lines such at communication lines, hydraulic lines, or any combination thereof. For example, auxiliary conductors, fiber optic lines, fluid lines, or any combination thereof may be positioned in the HTS cable in place and/or in addition to the HTS tape 214.

The HTS tape 206, 210, and 214 may include materials such as bismuth strontium calcium copper oxide (BSCCO) with a critical temperature of approximately 113 degrees Kelvin (K), yttrium barium copper oxide (YBCO) with a critical temperature of approximately 93 degrees K, etc. Any suitable superconducting material may be utilized to supply power to the BHA (or any other downhole components in drilling operations. Dielectrics 204, 208, and 212 may be positioned between each of the HTS tape 206, 210, and 214 to electrically insulate the layers. The dielectrics 204, 208, and 212 may comprise materials such as a polymer, elastomer, or any other suitable electrical insulating material. A jacket 216 may encase the outer most HTS tape 214 to protect the inner components of the HTS cable from the external environment such as fluid, pressure, drill cuttings, etc.

The HTS cable 200 is configured with a cryogenic liquid supply path 202 at the center of the cable. The cryogenic liquid supply path 202 may be a flow path for fluid, such as liquid nitrogen, liquid helium, etc., to be pumped into the HTS cable to reduce the temperature of HTS tape 206, 210, and 214 and allow the HTS tape 206, 210, and 214 to operate in superconducting mode. The cryogenic liquid supply path 202 may be pressurized to a pressure equal to or greater than the pressure external to the jacket 216 (such as in the wellbore) to maintain the integrity of the HTS cable 200, allow fluid to flow through HTS cable 200, etc. The HTS cable 200 depicts an open fluid loop for the cryogenic fluid, i.e., there is only one flow path (cryogenic liquid supply path 202) in the HTS cable 200. The fluid may be pumped into the HTS cable 200 at a point in the cable (such as at the surface, at a designated depth, etc.) and discharged at another point in the HTS cable 200 (such as at the bottom near the BHA, at a designated depth deeper than the injection point, etc.). Thus, the fluid may be discharged into the wellbore (such as into the drilling mud), rather than returning to the surface via a designated return channel in the HTS cable 200 (as described below).

Figure 3A:
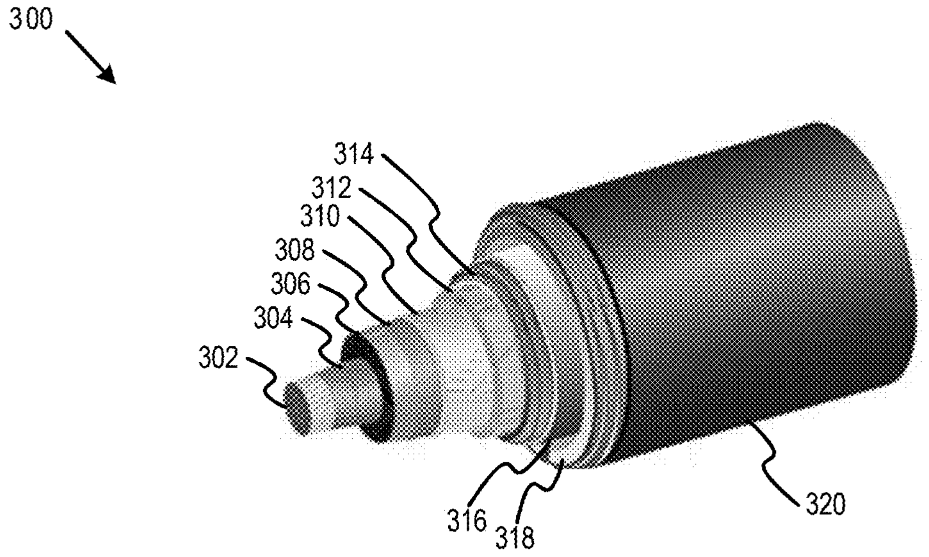
FIGS. 3A-3B are schematics of example coaxial high temperature superconducting cables, according to some implementations.
Figure 3B:
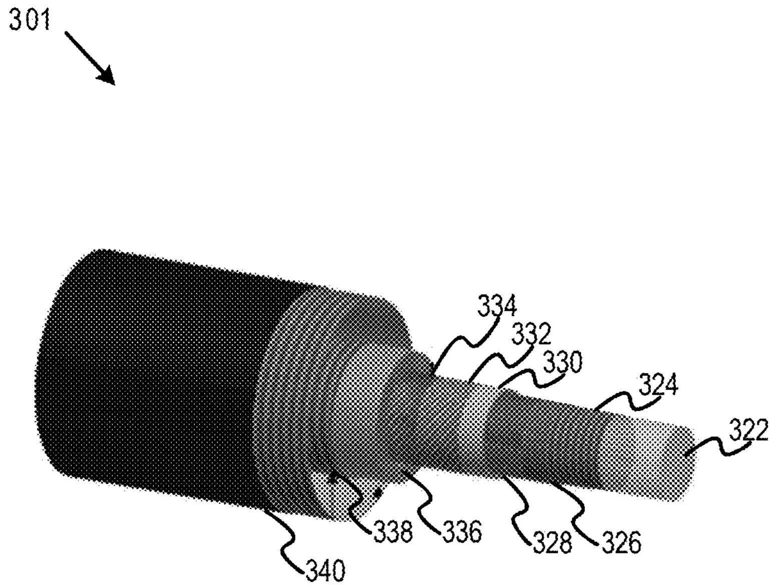

FIGS. 3A-3B are schematics of example coaxial high temperature superconducting cables, according to some implementations. In particular, FIG. 3A includes a partial cross-sectional view of a coaxial HTS cable 300 configured for DC transmission. The coaxial HTS cable 300 may be coupled to components of a downhole tool positioned in a wellbore (such as BHA 150 to supply power to the BHA 150 during pulsed power operations of the example pulsed power drilling system 100 of FIG. 1). The coaxial HTS cable 300 may include a copper core (or any other suitable conductor material) configured to supply auxiliary power to one or more components downhole. HTS tape 304 comprising superconducting material (similar to that described in FIG. 2) may encase the copper core 302. A high-voltage dielectric 306 may encase the HTS tape 304 for electric insulation. HTS shield tape 308 may encase the high-voltage dielectric 306. A copper shield wire 310 may encase the HTS shield tape 308. A cryogenic liquid supply channel 312 may encase the copper shield wire 310 and be configured to provide a flow path for fluid to cool the HTS tape 304. Similar to FIG. 2, the coaxial HTS tape 300 may be an open fluid loop. An inner crystal wall 314 and an outer crystal wall 318 may encase the cryogenic liquid supply channel 312. Between the inner crystal wall 314 and the outer crystal wall 318 may be a thermal insulator 316, such as a thermal "super insulator", a vacuum chamber, or any combination thereof, to provide thermal insulation for the fluid in the cryogenic liquid supply channel 312.

FIG. 3B includes a partial cross-sectional view of a coaxial HTS cable 301 configured with a closed fluid loop. The coaxial HTS cable 301 may be coupled to components of a downhole tool positioned in a wellbore (such as BHA 150 to supply power to the BHA 150 during pulsed power operations of the example pulsed power drilling system 100 of FIG. 1). The coaxial HTS cable 301 includes cryogenic liquid channels 322 and 336. One of the cryogenic liquid channels 322, 336 may act as the supply channel for a fluid to cool the superconducting material and the other may act as the return channel to return the fluid to the surface (or other location in the wellbore) to reduce the fluid temperature such that it may be re-injected into supply channels of the HTS cable 301. The coaxial HTS cable 301 may include similar components as the coaxial HTS cable 300. For example, the coaxial HTS cable 301 may include HTS layers 326, 332, copper layers 328, 334, dielectric layer 330, and an inner wall 338 and an outer wall 340 that may provide thermal insulation for the fluid in the cryogenic liquid channels 336. For example, the thermal insulation may be a vacuum chamber. A layer 324 may provide thermal insulation for the cryogenic liquid channels 322.

In some implementations, the coaxial HTS cables 300 and 301 described in FIGS. 3A-3B, respectively, may include other lines such at communication lines, hydraulic lines, or any combination thereof. Additionally, or alternatively, each of the coaxial HTS cables 300 and 301 may include any suitable combination of components (HTS tape, dielectrics, copper cores, cryogenic liquid channels, etc.) in any suitable configuration such that the HTS cable may supply DC power, AC power, and/or pulse power from the surface to a BHA in a wellbore during drilling operations.

Figure 4A:
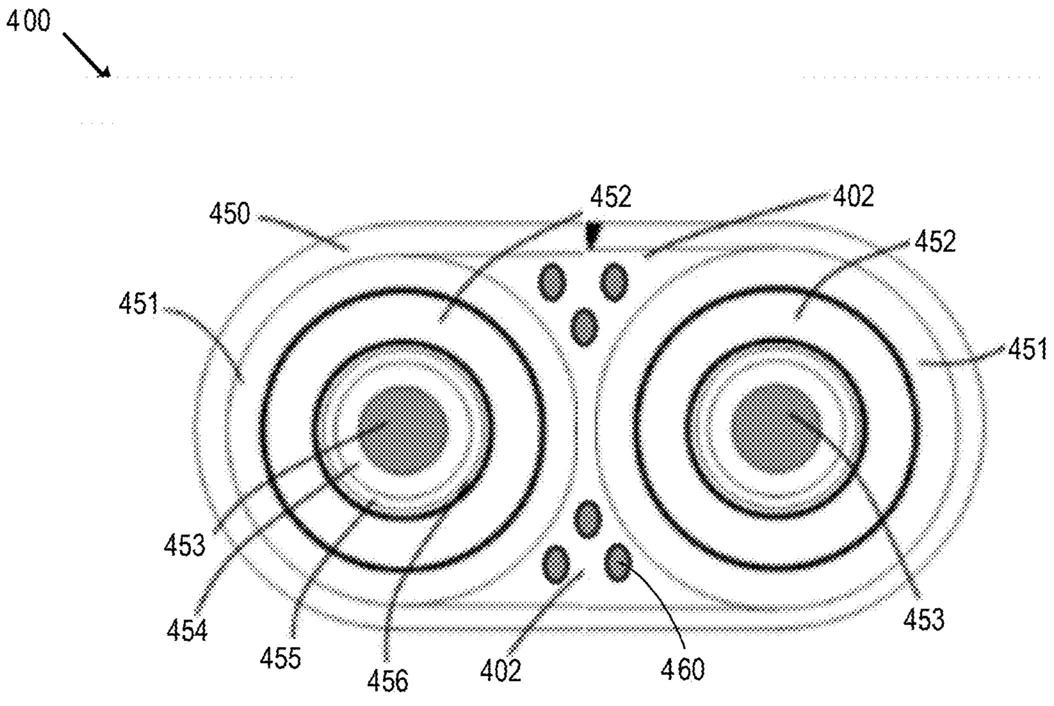
FIGS. 4A-4B are schematics of example high temperature superconducting cables, according to some implementations.
Figure 4B:
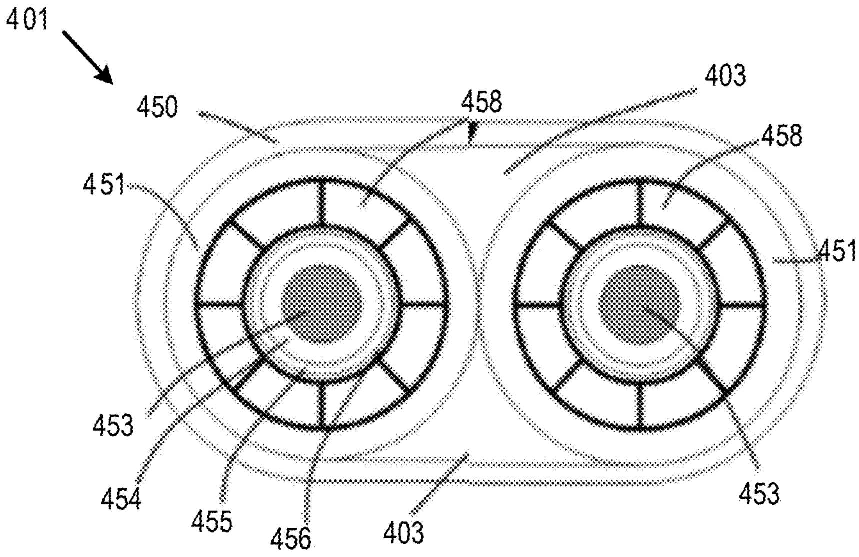

FIGS. 4A-4B are schematics of example high temperature superconducting cables, according to some implementations. In particular, FIG. 4A includes a partial cross-sectional view of a multiconductor HTS cable 400. The multiconductor HTS cable 400 may be coupled to components of a downhole tool positioned in a wellbore (such as BHA 150 to supply power to the BHA 150 during pulsed power operations of the example pulsed power drilling system 100 of FIG. 1). The multiconductor HTS cable 400 depicts a flat cable structure that consists of two quench conductors 453. The quench conductor 453 may use any suitable conductive material such as copper. In some implementations, the quench conductors may provide redundancy, as the superconducting material 455 may function as the main power supplier to the BHA and the quench conductors 453 may function as a secondary conductor if the cooling system within the superconducting cables may fail. Each quench conductor 453 may be encased with an electrical insulator 454 comprising materials such as a polymer, elastomer, or any other suitable electrical insulating material. Each of the electrical insulators 454 may be encased with a superconducting material 455. The superconducting material 455 may include materials such as bismuth strontium calcium copper oxide (BSCCO) with a critical temperature of approximately 113 degrees Kelvin (K), yttrium barium copper oxide (YBCO) with a critical temperature of approximately 93 degrees K, etc. Each superconducting material may be encased with an insulator 456.

To reduce the temperature of the superconducting material 455 (i.e., to reduce the superconducting material 455 to a respective temperature below its critical temperature), a cryogenic liquid supply channel 452 may encase each insulator 256. The cryogenic liquid supply channel 252 may be configured to supply fluid such as liquid helium, liquid nitrogen, etc. to the multiconductor HTS cable 400. A thermal insulator 451 may encase each cryogenic liquid supply channel 452. The thermal insulator 451 may include materials such as a polymeric compound that may protect each superconducting cable from wellbore fluid ingress by a lead tubing or any other suitable material. In some implementations, due to the cryogenic environment, the thermal insulators 451 may be applied via methods such as a lapped tape technique and include materials such as polypropylene laminated paper (PPLP). In some implementations, heat shrink polyethene terephthalate (PET) tubing, coating, etc. may also be utilized when conductor tapes, strands, etc. of the conductors are individually insulated. In some implementations, the thermal insulators 451 may include a vacuum chamber.

The superconducting cables (the quench conductors 453, superconducting material 455, cryogenic liquid supply channel 452, and insulators) may be wrapped in an armor 450. The material of the armor 450 may include Inconel, Monel, etc. In the implementation depicted in FIG. 4A, tubes 460 may be positioned in the area between the armor 450 and the superconducting cables (i.e., between the armor 350 and the thermal insulator 351). The tubes 460 may function as the cryogenic liquid return channels. The tubes 460 may be embedded in a thermal insulator 402 that may occupy the area between the armor 450 and the thermal insulator 451 and tubes 460. The thermal insulator 402 may include ceramic materials such as magnesium oxide (MgO2), elastomer, polymer. In some implementations, the thermal insulator 402 may be configured with any suitable material to withstand pressure (i.e., provide mechanical strength) such that the pressure of the environment external to the multiconductor HTS cable 400 does not collapse the armor 450 and/or damage any other internal components of the multiconductor HTS cable 400. In some implementations, the thermal insulator 402 may be replaced with a pressurized fluid to hydraulically balance the multiconductor HTS cable 400 with the external environment. In some implementations, the use of the thermal insulator 402 may ensure efficient cooling and return of the cryogenic fluid through the cryogenic liquid supply channels and cryogenic liquid return channels, respectively.

FIG. 4B includes a partial cross-sectional view of a multiconductor HTS cable 401. The multiconductor HTS cable 401 may be coupled to components of a downhole tool positioned in a wellbore (such as BHA 150 to supply power to the BHA 150 during pulsed power operations of the example pulsed power drilling system 100 of FIG. 1). The multiconductor HTS cable 401 may include similar components as the multiconductor HTS cable 400 of FIG. 4A. For example, the multiconductor HTS cable 401 includes a cable structure that consists of two quench conductors 453. Each quench conductor 453 may be encased with an electrical insulator 454. Each of the electrical insulators 454 may be encased with a superconducting material 455. Each superconducting material 455 may be encased with an insulator 456. A cryogenic liquid supply channel 458 may encase the insulator 456. In some implementations, the cryogenic liquid supply channel 458 may include a honeycomb structure that may provide strength and/or to improve colling performance. In the implementation depicted in FIG. 4B, the honeycomb structure of the cryogenic liquid supply channel 458 is depicted with 8 chambers. The cryogenic liquid supply channel 458 may include more or less than 8 chambers such as 2 chambers, 16 chambers, etc. In some implementations, the cryogenic liquid supply channels 458 within the multiconductor HTS cable 401 may include the same or a different number of chambers. For example, a cryogenic liquid supply channels 458 may include 4 chambers, and another cryogenic liquid supply channels 458 within the multiconductor HTS cable 401 may include 8 chambers. The cross sectional areas of the chambers within a cryogenic liquid supply channels 458 may be uniform or different. The cryogenic liquid supply channels 458 may be encased with a thermal insulator 451. The superconducting cables may be wrapped in an armor 450 to form the multiconductor HTS cable 401. In some implementations, areas between the conducting cable structures and the armor 450 (i.e., between the armor 450 and the thermal insulator 451) may function as a cryogenic liquid return channel 403, where the fluid may return to the surface.

The HTS cables described in FIGS. 4A-4B are configured with two superconducting cables for DC transmission and/or pulse power. In some implementations, each of the HTS cables may include a third (or more) superconducting cable for AC transmission. In some implementations, the multi-conductor HTS cable 400 and/or multiconductor HTS cable 401 may include additional cables and/or combination of cables configured with one or more components such at auxiliary power lines, telemetry lines, fluid lines, etc. with any suitable associated components such as dielectrics, insulators, etc. For example, a third cable within the armor 450 of the multiconductor HTS cable 400 may include a copper core and/or fiber optic lines, with appropriate insulators. In some implementations, the additional cables/lines may be bundled with the quench conductors 453.

Example System Architecture

Figure 5:
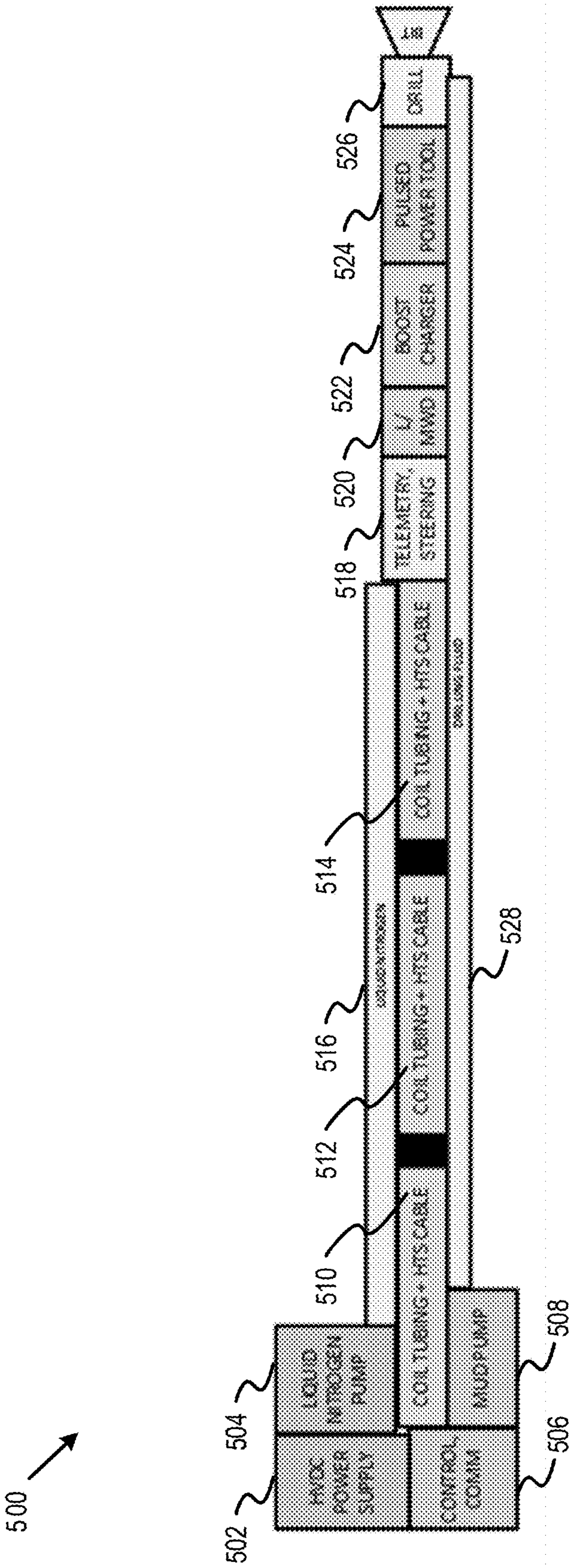
FIG. 5 is a diagram of an example pulsed power drilling system architecture, according to some implementations.
Figure 6:
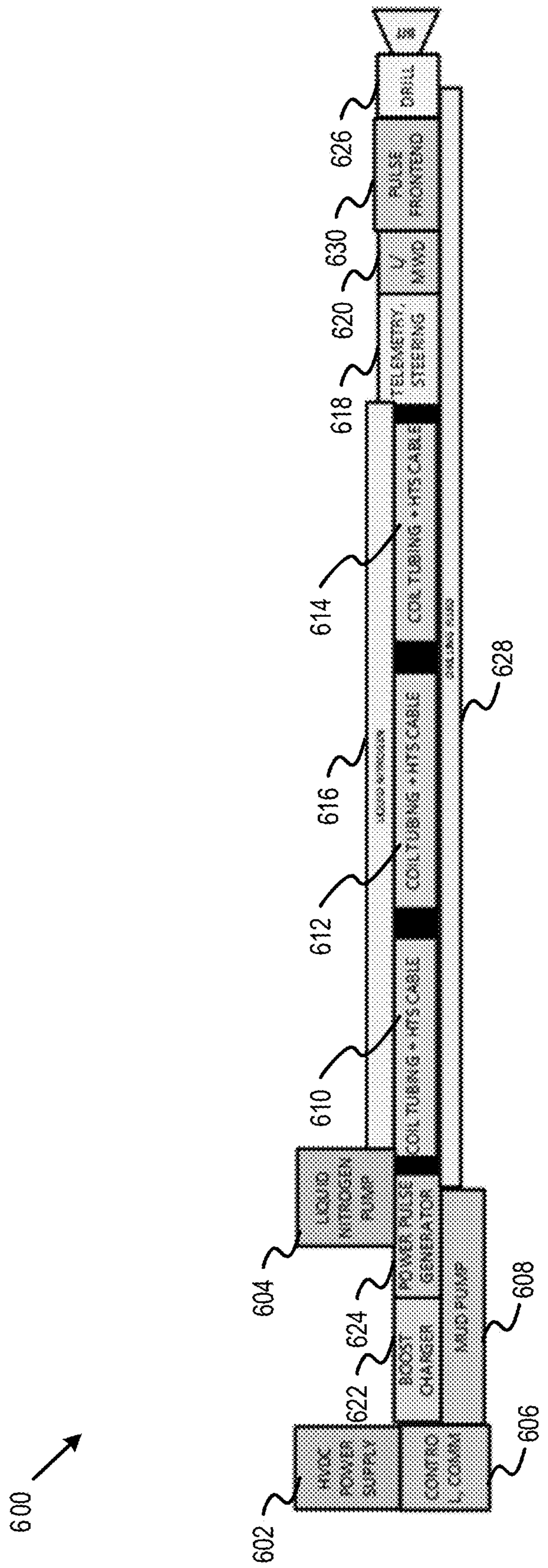
FIG. 6 is a diagram of an example pulsed power drilling system architecture, according to some implementations.
Figure 7:
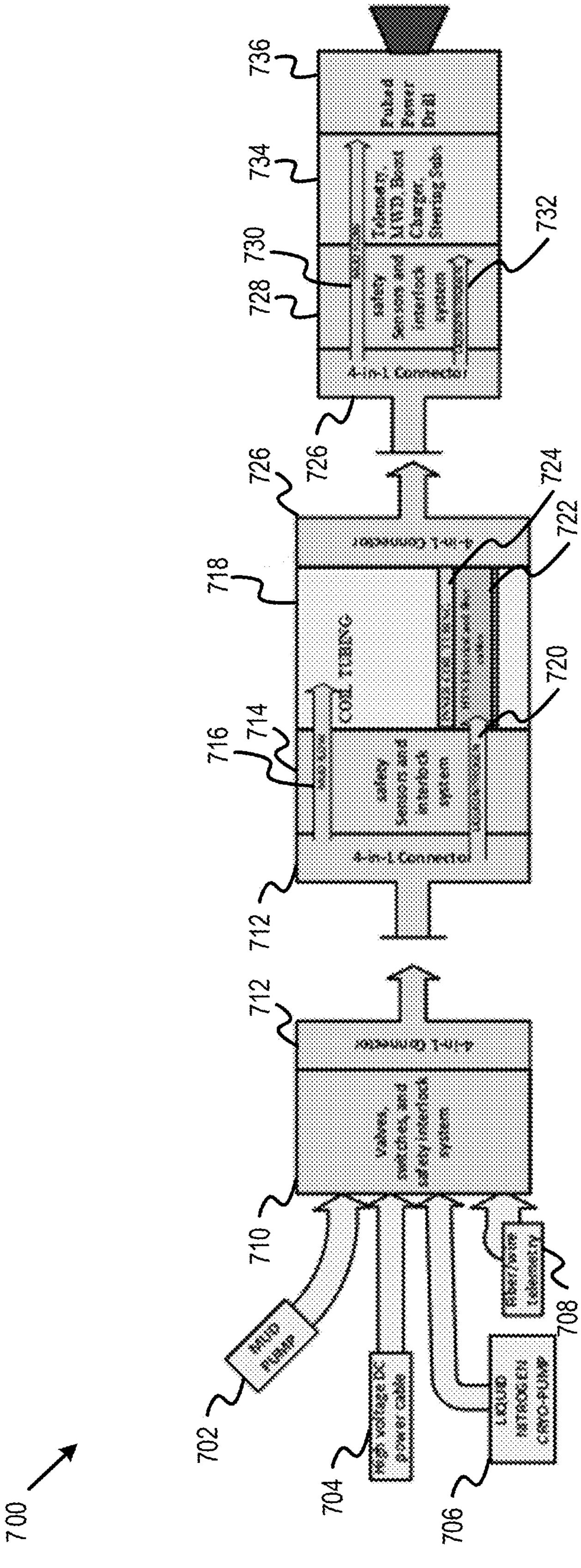
FIG. 7 is a diagram of an example pulsed power drilling system modular architecture, according to some implementations.

Example architectures of a pulsed power drilling system with one or more high temperature superconducting cables are now described in FIGS. 5-7. The example architectures are described in reference to the example pulsed power drilling system 100 of FIG. 1 and the HTS cables described in FIGS. 2-4.

FIG. 5 is a diagram of an example pulsed power drilling system architecture, according to some implementations. In particular, FIG. 5 includes a pulsed power drilling system 500 with one or more high temperature superconducting cables configured to deliver DC power to a BHA. The pulsed power drilling system 500 may include components positioned at or near the surface. The surface components may include a high voltage direct current (HVCD) power supply 502, one or more cryogenic pumps 504, one or more control/communication units 506, and one or more mud pumps 508. The mud pumps 508 may pump drilling fluid 528 into one or more joints of coiled tubing strings 510, 512, 514, through a BHA, to a drill bit 526. The drilling fluid 528 may then be circulated back up the annulus of the wellbore, transporting and solids/cuttings generated by the drill bit 526 as the drill bit 526 drills the wellbore. In some implementations, the flow of the drilling fluid 528 may be reverse circulated (i.e., down the wellbore annulus and up the coiled tubing strings 510, 512, 514. The BHA may include components such as telemetry/steering components 518, LWD/MWD components 520, a boost charger 522, a pulsed power tool 524, or any combination thereof.

Power may be supplied from the HVDC power supply 502 to the BHA via one or more HTS cables (such as the HTS cables described in FIGS. 2-4). In some implementations, the HTS cables may be positioned within their own coiled tubing string (or respective coiled tubing strings) that may then be positioned inside the coiled tubing strings 510, 512, 514 (i.e., the primary coiled tubing strings) or on the outside of the coiled tubing strings 510, 512, 514. In some implementations, the HTS cables may be positioned inside or outside the coiled tubing strings 510, 512, 514 without their own coiled tubing strings. FIG. 5 depicts multiple coiled tubing strings (coiled tubing strings 510, 512, 514). In some implementations there may be one continuous coiled tubing string coupling the surface components to the BHA. The pulsed power drilling system 500 may be configured such that the HTS cables may supply DC power to the BHA, which may then be converted to pulse power via the boost charger 522 and pulsed power tool 524 to drill the wellbore via pulsed power drilling. In some implementations, the HTS cables may include one or more cables such as telemetry cables, fluid lines, auxiliary power cables, etc. to electrically couple the control/communication units 506 with the components of the BHA (such the telemetry/steering components 518 and LWD/MWD components 520). In some implementations, the cables may not be integrated into the HTS cables. For example, they may be positioned in the HTS cable coiled tubing but not integrated into the HTS cable, positioned in a coiled tubing string separate from the HTS coiled tubing string, positioned inside or outside the coiled tubing strings 510, 512, 514, etc.

To keep the temperature of the one or more HTS cables below its respective critical temperature when transmitting power to the BHA, the cryogenic pump 504 may pump liquid nitrogen 516 into one or more cryogenic liquid supply channels within the HTS cables. The fluid and corresponding pump is not limited to liquid nitrogen 516, and may include any other suitable cryogenic fluid. In some implementations, the fluid loops for the liquid nitrogen 516 (or other cryogenic fluid) may be open looped or close looped. If open looped, the liquid nitrogen 516 may be discharged from the cryogenic liquid supply channels, and thus the HTS cables. The liquid nitrogen 516 may be discharged into the fluid within the coiled tubing housing the HTS cables, the coiled tubing strings 510, 512, 514, the annulus of the wellbore, etc. For example, the liquid nitrogen 516 may be discharged (and dissolved) into the drilling fluid 528 as the drilling fluid 528 is circulated back to surface. If close looped, the liquid nitrogen 516 may be circulated back to the surface in one or more cryogenic liquid return channels. The cryogenic liquid return channels may be integrated into the HTS cables or be separate from the HTS cables.

In some implementations, the cryogenic liquid supply channels may be configured to pump the liquid nitrogen 516 to the bottom of the coiled tubing (i.e., near the BHA) as continuous cryogenic liquid supply channels. In some implementations, the cryogenic liquid supply channels may be configured to pump liquid nitrogen 516 to sections of the HTS cable. For example, the cryogenic liquid supply channels pump liquid nitrogen 516 to a section in the HTS cables corresponding to a depth interval of 5,000 feet MD to 7,000 feet MD such that the liquid nitrogen 516 is not heated up before reaching the HTS cable at 5,000 ft MD to 7,000 ft MD. The cryogenic liquid supply channels may supply liquid nitrogen to various depth intervals along the HTS cable. The depth intervals may be uniform or nonuniform. In some implementations, the HTS cables and cryogenic liquid supply channels may be configured such that liquid nitrogen 516 may be pumped and/or diverted (such as by one or more valves) to specific sections of the HTS cables if the temperature in the respective section is at risk of increasing above the critical temperature level of the superconducting material.

FIG. 6 is a diagram of an example pulsed power drilling system architecture, according to some implementations. In particular, FIG. 6 includes a pulsed power drilling system 600 with one or more high temperature superconducting cables configured to deliver pulse power to a BHA. The pulsed power drilling system 600 may include similar components and function as the pulsed power drilling system 500 described in FIG. 5. For example, the pulsed power drilling system 600 may include HVDC power supply, one or more cryogenic pumps 604, one or more control/communication units 606, and one or more mud pumps 608 on the surface. The mud pumps 608 may pump drilling fluid 628 into one or more joints of coiled tubing strings 610, 612, 614, through a BHA, to a drill bit 626. The drilling fluid 628 may then be circulated back up the annulus of the wellbore, transporting and solids/cuttings generated by the drill bit 626 as the drill bit 626 drills the wellbore. In some implementations, the flow of the drilling fluid 628 may be reverse circulated (i.e., down the wellbore annulus and up the coiled tubing strings 610, 612, 614. The BHA may include components such as telemetry/steering components 618 and LWD/MWD components 620.

Power may be supplied from the HVDC power supply 602 to the BHA via one or more HTS cables (such as the HTS cables described in FIGS. 2-4). In some implementations, the HTS cables may be positioned within their own coiled tubing string (or respective coiled tubing strings) that may then be positioned inside the coiled tubing strings 610, 612, 614 (i.e., the primary coiled tubing strings) or on the outside of the coiled tubing strings 610, 612, 614. In some implementations, the HTS cables may be positioned inside or outside the coiled tubing strings 610, 612, 614 without their own coiled tubing strings. The pulsed power drilling system 600 may be configured with the boost charge 622 and pulse power generator 624 on the surface such that the HTS cables may supply pulse power to the BHA to drill the wellbore via pulsed power drilling. The power output from the HVDC power supply 602 may be converted from DC to pulse power prior to being transmitted to the BHA via the one or more HTS cables. In some implementations, the HTS cables may include one or more cables such as telemetry cables, fluid lines, auxiliary power cables, etc. to electrically couple the control/communication units 606 with the components of the BHA (such the telemetry/steering components 618 and LWD/MWD components 620).

Similar to the pulsed power drilling system 500, the cryogenic pump 604 may pump liquid nitrogen 616 into one or more cryogenic liquid supply channels within the HTS cables. The fluid and corresponding pump is not limited to liquid nitrogen 616, and may include any other suitable cryogenic fluid. The fluid loop may be open or closed. Similar to the pulsed power drilling system 500, the cryogenic liquid supply channels may supply the liquid nitrogen 616 to the entire HTS and/or to sections of the HTS cable.

FIG. 7 is a diagram of an example pulsed power drilling system modular architecture, according to some implementations. In particular, FIG. 7 includes a pulsed power drilling system modular architecture 700 comprising a surface module, downhole module, and BHA module. The components in the pulsed power drilling system modular architecture 700 may be similar in configuration and function to the components in the pulsed power drilling system 500 and pulsed power drilling system 600 of FIGS. 5 and 6, respectively.

The surface module may include the mud pump 702, high voltage direct current (HVDC) power cable 704, liquid nitrogen cryo-pump 706, telemetry cables 708, and valves, switches, and safety interlocking system 710. The downhole module may include safety sensors and interlocking system 714, mud flow 716 (such as mud flowing downhole to the BHA), coiled tubing 718 (similar to the coiled tubing strings 510-514 and 610-614, respectively), liquid nitrogen 720 (such as liquid nitrogen being pumped into HTS cables to maintain critical temperature), an inner coiled tubing 724 that may house one or more HTS cables 722 (and other telemetry lines, fiber optic cables, fluid lines, etc.). The BHA module may include safety sensors and interlocking system 728, mud flow 730, BHA components 734 (such as telemetry, MWD, LWD, steering, boost charger, pulsed power tool, etc. In some implementations the boost charger, pulsed power tool may be included in the surface module), and the pulsed power drill bit.

Each of the modules may be connected via connectors 712 and 726. For example, in the example implementation the connector 712 may be a 4-in-1 connector to couple the mud pump 702, high voltage direct current (HVDC) power cable 704, liquid nitrogen cryo-pump 706, and telemetry cables 708 to the downhole module. Likewise, the connector 726 may be a 4-in-1 connector to couple the similar components in the downhole module to the BHA module.

Example Operations

Example operations for powering a downhole tool via one or more superconducting cables are now described in reference to FIG. 1, FIGS. 2A-2B, FIGS. 3A-3B, FIGS. 4A-4B, FIGS. 5A-5B, and FIGS. 6A-6B.

Figure 8:
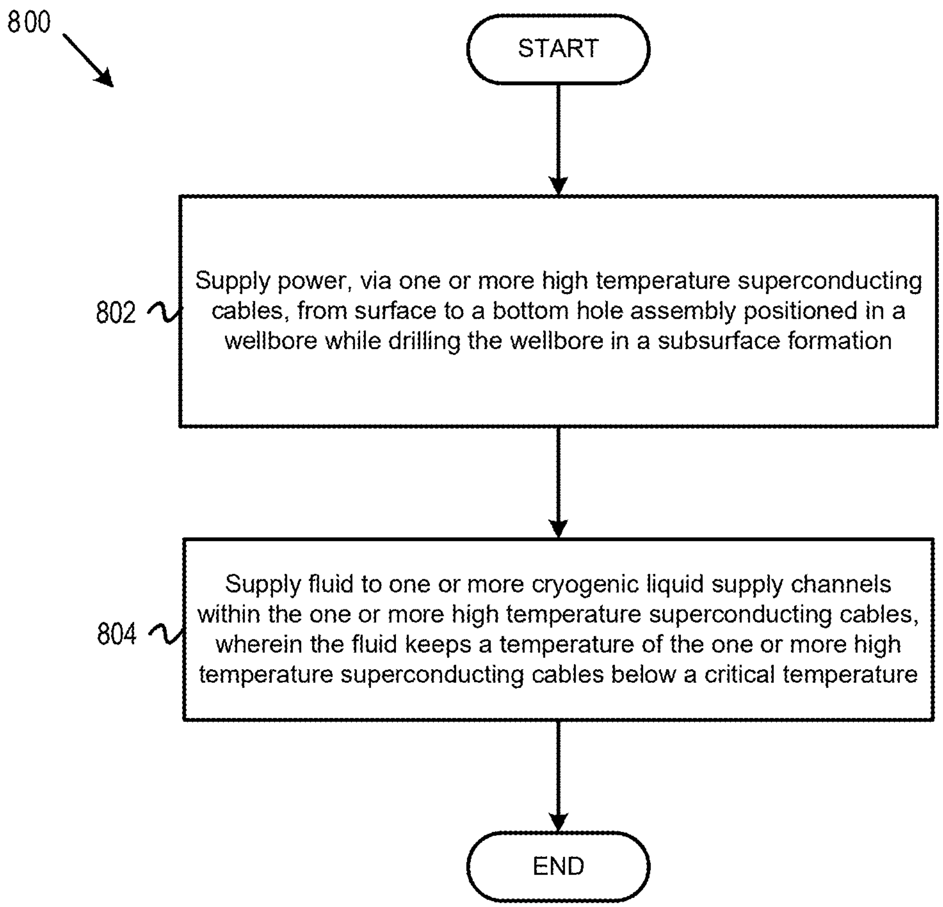
FIG. 8 is a flowchart of example operations for supplying power to a BHA via one or more high temperature superconducting cables, according to some implementations.

FIG. 8 is a flowchart of example operations for supplying power to a BHA via one or more high temperature superconducting cables, according to some implementations. FIG. 8 depicts a flowchart 800 of operations to supply power to pulsed power drilling operations via one or more HTS cables. The operations of flowchart 800 are described in reference to the cable 116 of FIG. 1 and HTS cables described in FIGS. 2-4, and the pulsed power drilling systems described in FIGS. 6-8.

At block 802, power may be supplied, via one or more high temperature superconducting cables, from surface to a bottom hole assembly positioned in a wellbore while drilling the wellbore in a subsurface formation.

At block 804 fluid may be supplied to one or more cryogenic liquid supply channels within the one or more high temperature superconducting cables, wherein the fluid keeps a temperature of the one or more high temperature superconducting cables below a critical temperature.

Additional Example Systems

Figure 9:
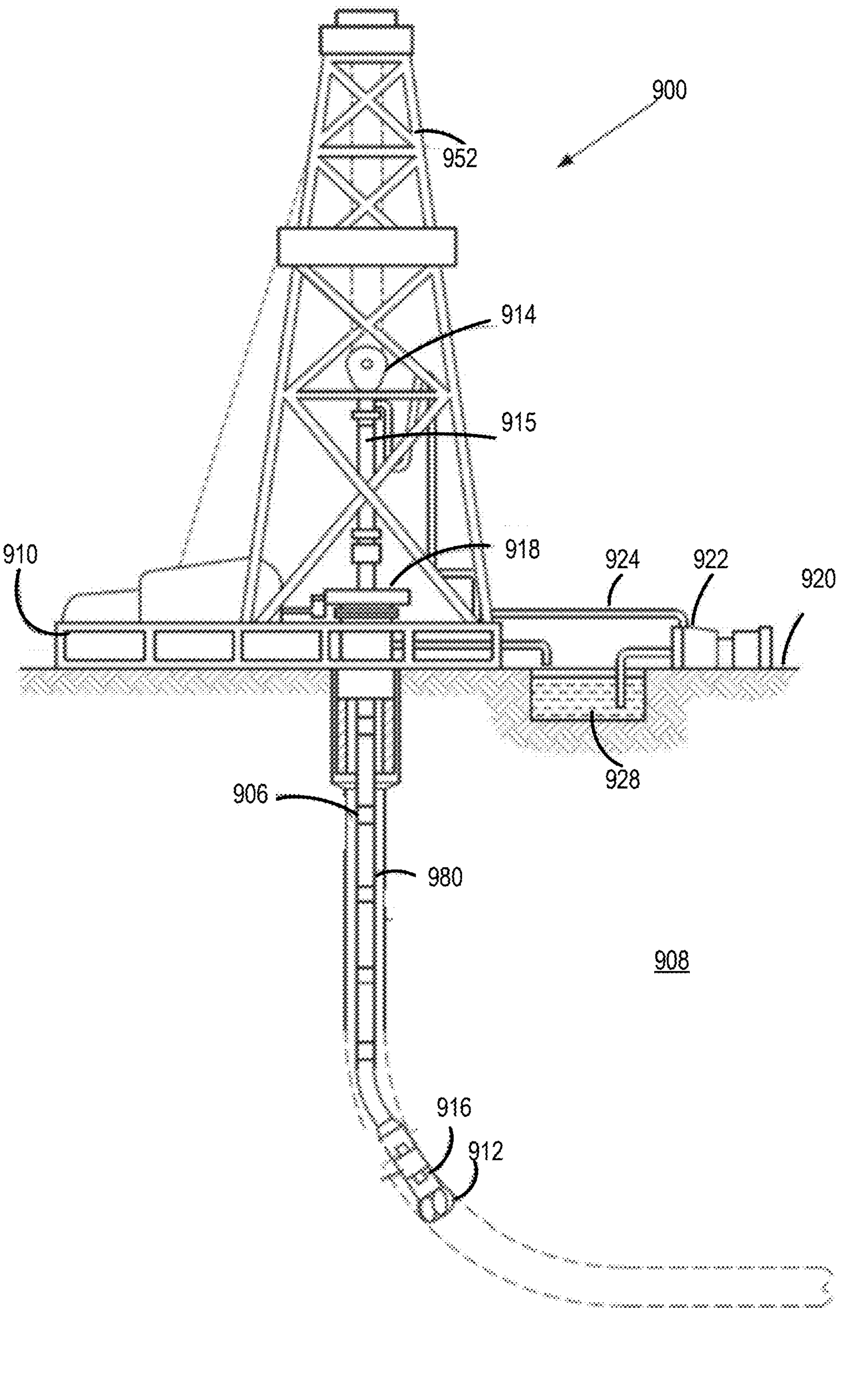
FIG. 9 is a schematic depicting an example well system, according to some implementations.

FIG. 9 is a schematic depicting an example well system, according to some implementations. In particular, FIG. 9 is a schematic diagram of a well system 900 that includes a drill string 906 having a drill bit 912 disposed in a wellbore 980 for drilling the wellbore 980 in the subsurface formation 908. While depicted for a land-based well system, example embodiments can be used in subsea operations that employ floating or sea-based platforms and rigs. The drill bit 912 forming the wellbore 980 is an example for which wellbore properties may be obtained from and utilized by a hole profile generator to determine the hole profile at measured depths of the wellbore 980 as described herein can be performed.

The well system 900 may further include a drilling platform 910 that supports a derrick 952 having a traveling block 914 for raising and lowering the drill string 906. The drill string 906 may include, but is not limited to, drill pipe, drill collars, and downhole tools 916 (such as a drill string bottom hole assembly (BHA)). The downhole tools 916 may comprise any of a number of different types of tools including measurement while drilling (MWD) tools, logging while drilling (LWD) tools, mud motors, and others. In some implementations, the well system may include one or more high temperature superconducting cables that supply power from a power source on the surface 920 to the downhole tools 916. For example, the HTS cables may be positioned inside a coiled tubing string that is positioned inside or outside the drill pipe.

A kelly 915 may support the drill string 906 as it may be lowered through a rotary table 918. While FIG. 9 is described relative to a drill bit 912, aspects of the disclosure may be applied to any downhole cutting structure or multiple downhole cutting structures. For instance, the drill bit 912 may include roller cone bits, polycrystalline diamond compact (PDC) bits, natural diamond bits, any hole openers, reamers, coring bits, and the like. As the drill bit 912 rotates, it may crush or cut rock to create and extend a wellbore 980 that penetrates various subterranean formations. The drill bit 912 may be rotated by various methods including rotation by a downhole mud motor and/or via rotation of the drill string 906 from the surface 920 by the rotary table 918. A pump 922 may circulate drilling fluid through a feed pipe 924 to the kelly 916, downhole through interior of the drill string 906, through orifices in the drill bit 912, back to the surface 920 via an annulus surrounding the drill string 906, and into a retention pit 928. Parameters of drilling the wellbore 980 may be adjusted to increase, decrease, and/or maintain the rate of penetration (ROP) of the drill bit 912 through the subsurface formation 908. Drilling parameters may include parameters measured at the surface 920 including weight-on-bit (WOB), torque-on-bit (TOB), rotations-per-minute (RPM) of the drill string 906, etc. In some implementations, the downhole tools 916 may include sensors to obtain drilling parameters and/or wellbore properties as the drill bit 912 drills the subsurface formation 908. The drilling parameters obtained from the sensors may include downhole WOB, downhole TOB, downhole RPM, drill bit vibration, etc. The wellbore properties may include inclination, azimuth, etc. In some implementations, the sensors may obtain subsurface formation properties such as lithology, permeability, etc.

While the aspects of the disclosure are described with reference to various implementations and exploitations, it will be understood that these aspects are illustrative and that the scope of the claims is not limited to them. In general, techniques for inducing vibrations in an impulse turbine as described herein may be implemented with facilities consistent with any hardware system or hardware systems. Many variations, modifications, additions, and improvements are possible.

Unless otherwise specified, use of the terms "up," "upper," "upward," "uphole," "upstream," or other like terms shall be construed as generally away from the bottom, terminal end of a well; likewise, use of the terms "down," "lower," "downward," "downhole," or other like terms shall be construed as generally toward the bottom, terminal end of the well, regardless of the wellbore orientation. Use of any one or more of the foregoing terms shall not be construed as denoting positions along a perfectly vertical axis. In some instances, a part near the end of the well can be horizontal or even slightly directed upwards. Unless otherwise specified, use of the term "subterranean formation" shall be construed as encompassing both areas below exposed earth and areas below earth covered by water such as ocean or fresh water.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, some operations may be omitted and/or other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described should not be understood as requiring such separation in all implementations, and the described program components and systems may generally be integrated together in a single software product or packaged into multiple software products. Additionally, other implementations are within the scope of the following claims. In some cases, the actions recited in the claims may be performed in a different order and still achieve desirable results.

Example Implementations

Implementation #1: An apparatus comprising: one or more high temperature superconducting cables configured to supply power from surface to a bottom hole assembly positioned in a wellbore while drilling the wellbore in a subsurface formation; and one or more cryogenic liquid supply channels positioned within the one or more high temperature superconducting cables, wherein fluid is pumped, via one or more cryogenic pumps, into the one or more cryogenic liquid supply channels to keep a temperature of the one or more high temperature superconducting cables below a critical temperature.

Implementation #2: The apparatus of Implementations #1, wherein the wellbore is drilled via pulsed power drilling, and wherein the bottom hole assembly is coupled with one or more coiled tubing used for the pulsed power drilling.

Implementation #3: The apparatus of Implementation #2, wherein the one or more high temperature superconducting cables are positioned inside a first coiled tubing, and wherein the first coiled tubing is positioned inside a second coiled tubing.

Implementation #4: The apparatus of Implementation #2 or #3, wherein the one or more high temperature superconducting cables are positioned inside a first coiled tubing, and wherein the first coiled tubing is positioned outside a second coiled tubing.

Implementation #5: The apparatus of any one or more of Implementation #1-4, wherein the fluid includes liquid nitrogen or liquid helium.

Implementation #6: The apparatus of any one or more of Implementation #1-5, wherein the power supplied to the bottom hole assembly includes the power in the form of at least one of alternating current, direct current, or pulse form.

Implementation #7: The apparatus of any one or more of Implementation #1-6 further comprising: one or more components bundled with the one or more high temperature superconducting cables, the one or more components including auxiliary power conductors, telemetry conductors, fluid lines, or any combination thereof.

Implementation #8: The apparatus of any one or more of Implementation #1-7, wherein the bottom hole assembly includes at least one of one or more telemetry components, one or more logging tools, one or more steering components, one or more pulsed power tools, a drill bit, or any combination thereof.

Implementation #9: The apparatus of any one or more of Implementation #1-8, wherein the one or more cryogenic liquid supply channels are configured to supply the fluid to one or more sections of the one or more high temperature superconducting cables.

Implementation #10: A system comprising: one or more high temperature superconducting cables configured to supply power from surface to a bottom hole assembly positioned in a wellbore while drilling the wellbore in a subsurface formation; one or more cryogenic liquid supply channels positioned within the one or more high temperature superconducting cables, wherein fluid is pumped into the one or more cryogenic liquid supply channels to keep a temperature of the one or more high temperature superconducting cables below a critical temperature; and one or more cryogenic pumps configured to pump the fluid into the one or more cryogenic liquid supply channels.

Implementation #11: The system of Implementation #10, wherein the wellbore is drilled via pulsed power drilling, and wherein the bottom hole assembly is coupled with one or more coiled tubing used for the pulsed power drilling.

Implementation #12: The system of Implementation #11, wherein the one or more high temperature superconducting cables are positioned inside a first coiled tubing, and wherein the first coiled tubing is positioned inside a second coiled tubing.

Implementation #13: The system of Implementation #11 or #12, wherein the one or more high temperature superconducting cables are positioned inside a first coiled tubing, and wherein the first coiled tubing is positioned outside a second coiled tubing.

Implementation #14: The system of any one or more of Implementation #10-13, wherein the fluid includes liquid nitrogen or liquid hydrogen.

Implementation #15: The system of any one or more of Implementation #10-14, wherein the power supplied to the bottom hole assembly includes the power in the form of at least one of alternating current, direct current, or pulse form.

Implementation #16: The system of any one or more of Implementation #10-15 further comprising: one or more components bundled with the one or more high temperature superconducting cables, the one or more components including auxiliary power conductors, telemetry conductors, fluid lines, or any combination thereof.

Implementation #17: A method comprising: drilling a wellbore in a subsurface formation with a bottom hole assembly; supplying power, via one or more high temperature superconducting cables, from surface to the bottom hole assembly positioned in the wellbore; and supplying a fluid, via one or more cryogenic pumps, to one or more cryogenic liquid supply channels positioned within the one or more high temperature superconducting cables, wherein the fluid keeps a temperature of the one or more high temperature superconducting cables below a critical temperature.

Implementation #18: The method of Implementation #17 further comprising: drilling the wellbore via pulsed power drilling, wherein the bottom hole assembly is coupled with one or more coiled tubing used for the pulsed power drilling.

Implementation #19: The method of Implementation #18, wherein the one or more high temperature superconducting cables are positioned inside a first coiled tubing, and wherein the first coiled tubing is positioned inside a second coiled tubing.

Implementation #20: The method of Implementation #18 or #19, wherein the one or more high temperature superconducting cables are positioned inside a first coiled tubing, and wherein the first coiled tubing is positioned outside a second coiled tubing.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

The invention claimed is:

1. An apparatus comprising:

one or more high temperature superconducting cables configured to supply power from surface to a bottom hole assembly positioned in a wellbore while drilling the wellbore in a subsurface formation;

one or more cryogenic liquid supply channels positioned within the one or more high temperature superconducting cables and configured to supply fluid to one or more depth intervals of the one or more high temperature superconducting cables, wherein the fluid is pumped, via one or more cryogenic pumps, into the one or more cryogenic liquid supply channels to keep a temperature of the one or more high temperature superconducting cables at respective depth intervals below a critical temperature, and wherein at least one of the one or more cryogenic liquid supply channels includes two or more chambers; and one or more cryogenic liquid return channels positioned within the one or more high temperature superconducting cables and configured to return the fluid to the surface from the one or more cryogenic liquid supply channels.

2. The apparatus of claim 1, wherein the wellbore is drilled via pulsed power drilling, and wherein the bottom hole assembly is coupled with one or more coiled tubing used for the pulsed power drilling.

3. The apparatus of claim 2, wherein the one or more high temperature superconducting cables are positioned inside a first coiled tubing, and wherein the first coiled tubing is positioned inside a second coiled tubing.

4. The apparatus of claim 2, wherein the one or more high temperature superconducting cables are positioned inside a first coiled tubing, and wherein the first coiled tubing is positioned outside a second coiled tubing.

5. The apparatus of claim 1, wherein the fluid includes liquid nitrogen or liquid helium.

6. The apparatus of claim 1, wherein the power supplied to the bottom hole assembly includes the power in the form of at least one of alternating current, direct current, or pulse form.

7. The apparatus of claim 1 further comprising:

one or more components bundled with the one or more high temperature superconducting cables, the one or more components including auxiliary power conductors, telemetry conductors, fluid lines, or any combination thereof.

8. The apparatus of claim 1, wherein the bottom hole assembly includes at least one of one or more telemetry components, one or more logging tools, one or more steering components, one or more pulsed power tools, a drill bit, or any combination thereof.

9. A system comprising:

one or more high temperature superconducting cables configured to supply power from surface to a bottom hole assembly positioned in a wellbore while drilling the wellbore in a subsurface formation;

one or more cryogenic liquid supply channels positioned within the one or more high temperature superconducting cables and configured to supply fluid to one or more depth intervals of the one or more high temperature superconducting cables, wherein the fluid is pumped into the one or more cryogenic liquid supply channels to keep a temperature of the one or more high temperature superconducting cables at the respective depth intervals below a critical temperature, and wherein at least one of the one or more cryogenic liquid supply channels includes two or more chambers;

one or more cryogenic pumps configured to pump the fluid into the one or more cryogenic liquid supply channels; and one or more cryogenic liquid return channels positioned within the one or more high temperature superconducting cables and configured to return the fluid to the surface from the one or more cryogenic liquid supply channels.

10. System of claim 9, wherein the wellbore is drilled via pulsed power drilling, and wherein the bottom hole assembly is coupled with one or more coiled tubing used for the pulsed power drilling.

11. The system of claim 10, wherein the one or more high temperature superconducting cables are positioned inside a first coiled tubing, and wherein the first coiled tubing is positioned inside a second coiled tubing.

12. The system of claim 10, wherein the one or more high temperature superconducting cables are positioned inside a first coiled tubing, and wherein the first coiled tubing is positioned outside a second coiled tubing.

13. The system of claim 9, wherein the fluid includes liquid nitrogen or liquid hydrogen.

14. The system of claim 9, wherein the power supplied to the bottom hole assembly includes the power in the form of at least one of alternating current, direct current, or pulse form.

15. The system of claim 9 further comprising:

one or more components bundled with the one or more high temperature superconducting cables, the one or more components including auxiliary power conductors, telemetry conductors, fluid lines, or any combination thereof.

16. A method comprising:

drilling a wellbore in a subsurface formation with a bottom hole assembly;

supplying power, via one or more high temperature superconducting cables, from surface to the bottom hole assembly positioned in the wellbore; and supplying a fluid, via one or more cryogenic pumps, to one or more cryogenic liquid supply channels positioned within the one or more high temperature superconducting cables and configured to supply the fluid to one or more depth intervals of the one or more high temperature superconducting cables, wherein the fluid keeps a temperature of the one or more high temperature superconducting cables at the respective depth intervals below a critical temperature, and wherein at least one of the one or more cryogenic liquid supply channels includes two or more chambers, and wherein the fluid returns to the surface, via one or more cryogenic liquid return channels positioned within the one or more high temperature superconducting cables, from the one or more cryogenic liquid supply channels.

17. The method of claim 16 further comprising:

drilling the wellbore via pulsed power drilling, wherein the bottom hole assembly is coupled with one or more coiled tubing used for the pulsed power drilling.

18. The method of claim 17, wherein the one or more high temperature superconducting cables are positioned inside a first coiled tubing, and wherein the first coiled tubing is positioned inside a second coiled tubing.

19. The method of claim 17, wherein the one or more high temperature superconducting cables are positioned inside a first coiled tubing, and wherein the first coiled tubing is positioned outside a second coiled tubing.

* * * * *